United States Patent
Xu et al.

(10) Patent No.: US 11,995,246 B2
(45) Date of Patent: May 28, 2024

(54) METHOD FOR TOUCHLESS GESTURE RECOGNITION, AND APPARATUSES USING THE SAME

(71) Applicant: Fortemedia, Inc., Santa Clara, CA (US)

(72) Inventors: Yu-Xuan Xu, Hsinchu (TW); Ching-Lung Chan, Hsinchu (TW); Shih-Chung Wang, Hsinchu (TW); Yen-Son Paul Huang, Santa Clara, CA (US); Shih-Chin Gong, Taipei (TW)

(73) Assignee: FORTEMEDIA, INC., Alviso, CA (US)

( * ) Notice: Subject to any disclaimer, the term of this patent is extended or adjusted under 35 U.S.C. 154(b) by 0 days.

(21) Appl. No.: 18/167,949

(22) Filed: Feb. 13, 2023

(65) Prior Publication Data
US 2024/0126374 A1    Apr. 18, 2024

Related U.S. Application Data

(60) Provisional application No. 63/379,455, filed on Oct. 14, 2022.

(51) Int. Cl.
G06F 3/16     (2006.01)
G06F 3/01     (2006.01)

(52) U.S. Cl.
CPC .............. *G06F 3/017* (2013.01); *G06F 3/167* (2013.01)

(58) Field of Classification Search
CPC ................................ G06F 3/017; G06F 3/167
See application file for complete search history.

(56) References Cited

U.S. PATENT DOCUMENTS

| | | | |
|---|---|---|---|
| 2013/0271397 A1* | 10/2013 | MacDougall | G06F 3/0304 345/173 |
| 2015/0023138 A1* | 1/2015 | Liu | G01S 3/808 367/124 |
| 2021/0042511 A1* | 2/2021 | Manandhar | H04R 1/1008 |

* cited by examiner

*Primary Examiner* — Robert J Michaud
(74) *Attorney, Agent, or Firm* — McClure, Qualey & Rodack, LLP (57) ABSTRACT

A method for touchless gesture recognition is provided. The method includes transmitting ultrasonic signals via a speaker. The method includes generating ultrasonic signals. The method includes receiving the reflected ultrasonic signals from an object via two or more microphones. The method includes computing a frequency shift according to the reflected ultrasonic signals. The method includes identifying a gesture that corresponds to a movement of the object according to the frequency shift. The method includes performing a function that corresponds to the gesture.

14 Claims, 6 Drawing Sheets

METHOD FOR TOUCHLESS GESTURE RECOGNITION, AND APPARATUSES USING THE SAME

CROSS REFERENCE TO RELATED APPLICATIONS

This Application claims priority of U.S. Provisional Application No. 63/379,455, filed on Oct. 14, 2022, the entirety of which is incorporated by reference herein.

BACKGROUND OF THE INVENTION

Field of the Invention

The present disclosure generally relates to gesture recognition technologies. More specifically, aspects of the present disclosure relate to a method for touchless gesture recognition and apparatuses using the same.

Description of the Related Art

Wearable apparatuses such as earphones are widely used. An earphone is typically connected to a media player through a wire or a Bluetooth connection. Typically, a user may change the content being played by the media player, and the volume thereof, using only by the keypad on the media player.

Along with the development of earphone technology, many earphone devices can be used to adjust the volume or otherwise control the audio through touch-control. The way of using touch-control earphones gets rid of the limitations of volume adjustment and audio control on the hardware conditions of earphones in the past, and improves the convenience of earphone use.

A general touch-control earphone uses a force sensor to detect the number and position of the user's touches on the earphone to adjust the volume and to control the audio. However, this approach is not intuitive. Therefore, there is a need for a method for touchless gesture recognition, and an apparatus using the same to solve this problem.

BRIEF SUMMARY OF THE INVENTION

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, the main purpose of the present disclosure is to provide a method for touchless gesture recognition, and apparatus using the same to make earphones more intuitive to use.

In an exemplary embodiment, a method for touchless gesture recognition is provided. The method comprises generating ultrasonic signals. The method comprises transmitting the ultrasonic signals via a speaker. The method comprises receiving reflected ultrasonic signals from an object via two or more microphones. The method comprises computing a frequency shift according to the reflected ultrasonic signals. The method comprises identifying a gesture that corresponds to a movement of the object according to the frequency shift. The method comprises performing a function that corresponds to the gesture.

In some embodiments, one of the following functions is performed: turning the volume of the speaker on or off; turning the volume of the speaker up or down; playing or pausing an audio file; and skipping backward to a previous audio file or skipping forward to a next audio file.

In some embodiments, the gesture is a one-dimensional gesture.

In some embodiments, the movement of the object is a swipe or wave in one direction.

In some embodiments, the direction is left to right, right to left, up to down, or down to up.

In some embodiments, the gesture is a two-dimensional gesture when there are more than two microphones.

In some embodiments, the gesture corresponding to the movement of the object is identified by machine learning.

In some embodiments, the portable electronic device is a pair of earphones.

In some embodiments, the object is a hand.

In an exemplary embodiment, a portable electronic device is provided. The system comprises a speaker, two or more microphones, a processing unit and one or more computer storage media for storing one or more computer-readable instructions. The processing unit is coupled to the speaker and the two or more microphones. The processing unit is configured to drive the computer storage media to execute the following tasks: generating ultrasonic signals; transmitting the ultrasonic signals via the speaker; receiving reflected ultrasonic signals from an object via the two or more microphones; computing a frequency shift according to the reflected ultrasonic signals; identifying a gesture that corresponds to a movement of the object according to the frequency shift; and performing a function that corresponds to the gesture.

BRIEF DESCRIPTION OF THE DRAWINGS

The accompanying drawings are included to provide a further understanding of the present disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

DETAILED DESCRIPTION OF THE INVENTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

Figure 1:
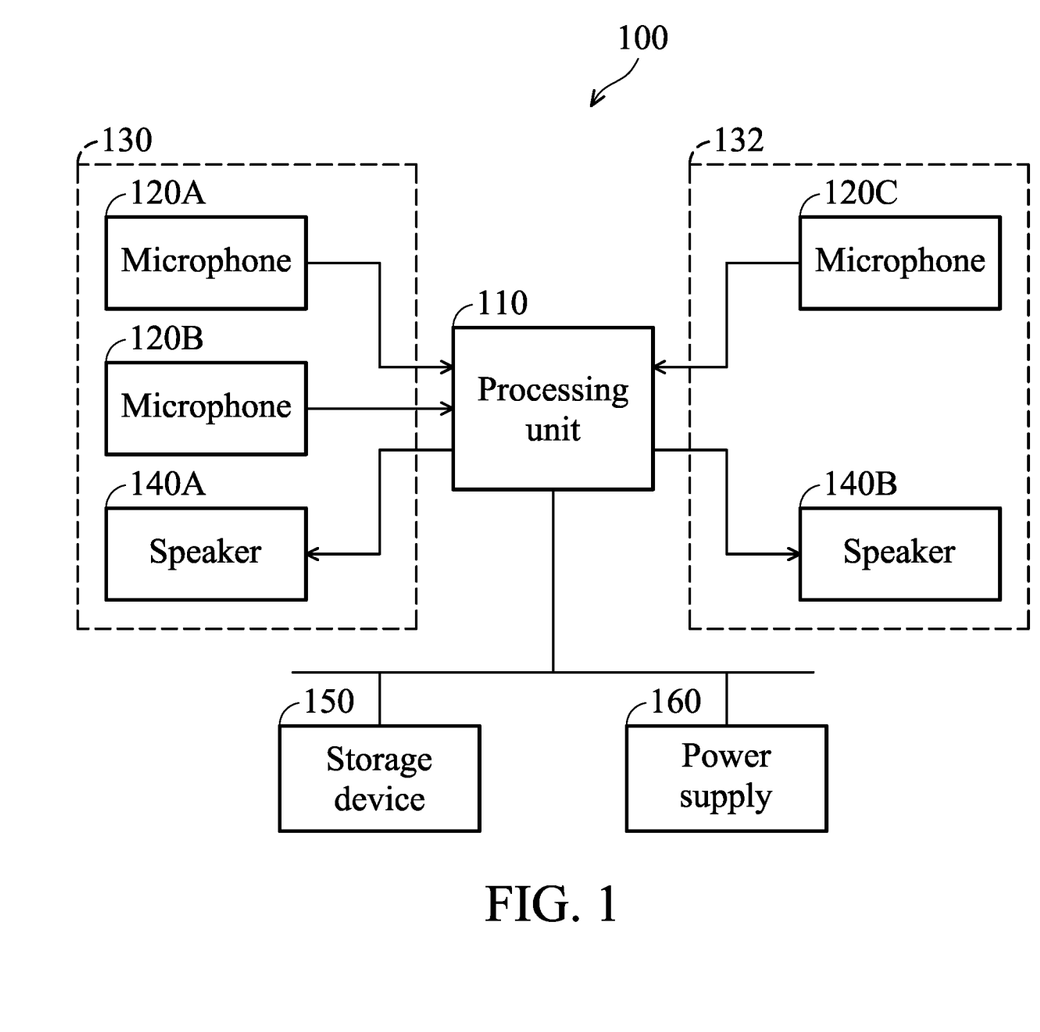
FIG. 1 is a block diagram of a portable electronic device according to an embodiment of the disclosure.

FIG. 1 is a block diagram of a portable electronic device 100 according to an embodiment of the disclosure. The portable electronic device 100 may be a single earphone (e.g., a true wireless stereo (TWS) earbud or an earphone with other types of speakers). The single earphone may be used on either the left or right side of the head. The use of a single earphone is sometimes described herein as an example. This is, however, merely illustrative. The portable electronic device 100 may be implemented using any suitable electronic equipment.

It should be understood that the term "earphone" may refer to any suitable type of audio headset (e.g., a headphone, an over-the-ear headphone, an earbud, an earbud-type headphone with ear hooks, an in-ear headphone that extends partially into the ear canal, etc.).

As shown in FIG. 1, the portable electronic device 100 may include speakers 140A and 140B (e.g., a left speaker and a right speaker), microphones 120A, 120B and 120C (e.g., two left microphones and a right microphone), a processing unit 110, a storage device 150, and a power supply 160, wherein the left part 130 including the microphones 120A and 120B, and the speaker 140A is designed to the environment, and the right part 132 including the microphone 120C and the speaker 140B is toward an ear.

The processing unit 110 is coupled to the speakers 140A and 140B, and the microphones 120A, 120B and 120C, the storage device 150 and the power supply 160, wherein the processing unit 110, the storage device 150 and the power supply 160 may be integrated into the left part 130 and/or the right part 132. The microphone 120C is designed for active noise cancellation (ANC). The microphone 120A and the microphone 120B are used for beam forming and gesture direction judgement. The processing unit 110 is used to collect microphone signals to do digital signal processing. Active noise cancellation uses the microphones 120C and the speakers 140B to reduce background and surrounding noise. The portable electronic device 100 is based on the microphones 120A and 120B that "listen" to the sounds outside and inside of the portable electronic device 100, an ANC chipset inverting the soundwaves and the speaker 140B inside the portable electronic device 100 cancelling the outside sound by the neutralizing soundwaves. It should be noted that although the number of microphones in FIG. 1 used in this example is three, it should not be limited in the disclosure. The number of microphones may be two or more than two.

The speaker 140A is configured to transmit ultrasonic signals, while the microphones 120A and 120B are configured to receive reflected ultrasonic signals from an object, such as the user's hand or a handheld item. Ultrasound is a cyclic sound pressure defined as operating at frequencies above the upper limits of human hearing, or between approximately 20 KHz to 40 KHz. Specifically, the one of the speakers 140A and 140B may be an ultrasound transmitter capable of emitting audio signals in the ultrasound spectrum, and the microphones 120A and 120B may be the ultrasound receivers capable of sensing reflected audio signals in the ultrasound spectrum. In one embodiment, another speaker 140B that is not be configured to transmit ultrasonic signals may be used to play audio files or music. The microphone 120C is used to collect noise from the environment into the ear. The speaker 140B is also used to do active noise cancellation.

The processing unit 110 in the portable electronic device 100 may be a general-purpose processor, a Micro-Control Unit (MCU), a Digital Signal Processor (DSP), or another type of processor, which provides the function of data processing and computing of the reflected ultrasonic signals received by the microphones 120A, 120B and 120C, and loads and executes a series of instructions and/or program codes from the storage device 150 to perform the method of the disclosure for touchless gesture recognition, and/or controls the operation of the speakers 140A and 140B and the microphones 120A, 120B and 120C. The processing unit 110 transmits ultrasonic signals to the speaker 140A. The microphone 120A and the microphone 120B collect reflected ultrasonic signals, and the processing unit 110 processes the reflected ultrasonic signals to identify a gesture.

The portable electronic device 100 typically includes a variety of computer-readable media. The computer-readable media can be any available media that can be accessed by the portable electronic device 100 and includes both volatile and nonvolatile media, removable and non-removable media. By way of example, not limitation, computer-readable media may comprise computer storage media and communication media. The computer storage media may include volatile and nonvolatile, removable and non-removable media implemented in any method or technology for storage of information such as computer-readable instructions, data structures, program modules or other data. The computer storage media may include, but not limit to, random access memory (RAM), read-only memory (ROM), electrically-erasable programmable read-only memory (EEPROM), flash memory or other memory technology, or any other medium which can be used to store the desired information and which can be accessed by the portable electronic device 100. The computer storage media may not comprise signals per se. The processing unit 110 also plays music through the speaker 140B. The microphone 120C collects noise from the environment into the ear and informs the noise to the processing unit 110. Then, the processing unit 110 generates signals to the speaker 140B to generate anti-phase sound to cancel noise sound.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media or any combination thereof.

The storage device 150 may be a memory (e.g., Random Access Memory (RAM), Flash memory, or Non-Volatile Random Access Memory (NVRAM), etc.), a magnetic storage device (e.g., magnetic tape or hard disk), an optical storage device (e.g., Compact Disc Read-Only Memory (CD-ROM)), or any combination thereof for storing data, such as instructions, and program codes.

The power supply 160 may be a portable/replaceable and chargeable battery, which provides power to the other functional units, including the speakers 140A and 140B, the microphones 120A, 120B and 120C, the processing unit 110, and the storage device 150, and allows portability of the portable electronic device 100.

Although not shown, the portable electronic device 100 may further comprise other functional units, such as user input devices (e.g., buttons), touch-based input devices (e.g., touch screens, touch pads, touch buttons), user detection sensor structures, and other user input devices. The user detection sensor structures may be configured to detect whether or not the earphones have been placed in or on the ears of a user. The user detection sensors may be formed from acoustic-based sensors such as ultrasonic acoustic-based sensors, from capacitive sensors, from temperature sensors, from force sensors, from resistance-based sensors, from light-based sensors, and/or from switch-based sensors or other mechanical sensors (as examples).

It should be understood that the components described in the embodiment of FIG. 1 is for illustrative purposes only and are not intended to limit the scope of the present disclosure.

Figure 2:
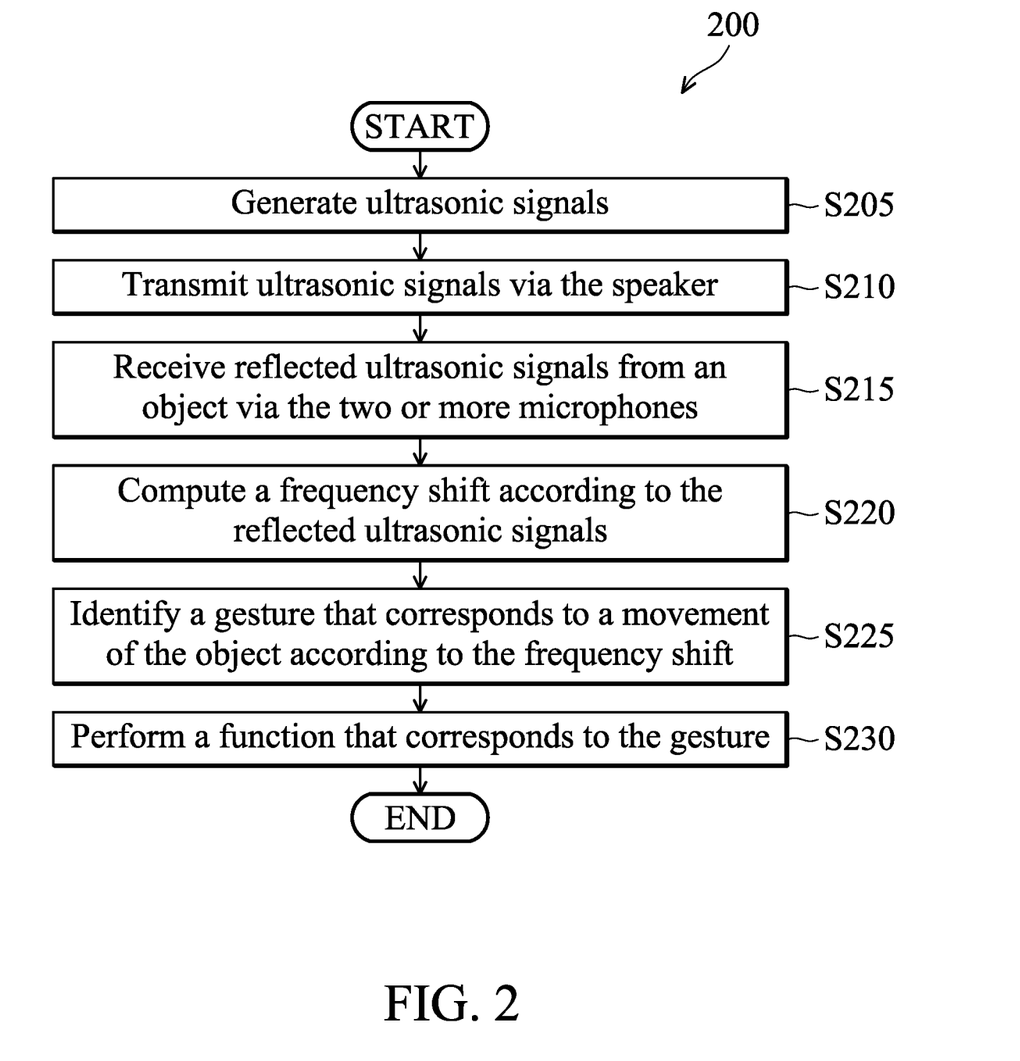
FIG. 2 is a flow chart illustrating the method for touchless gesture recognition according to an embodiment of the disclosure.

FIG. 2 is a flow chart 200 illustrating the method for touchless gesture recognition according to an embodiment of the disclosure. In this embodiment, the method is applied to a portable electronic device comprising at least one speaker, two or more microphones and a processing unit.

In step S205, the processing unit of the portable electronic device generates ultrasonic signals and transmits the ultrasonic signals to a speaker. In step S210, the portable electronic device transmits ultrasonic signals via the speaker. The ultrasonic signals are greater than 20 KHz and far away the audio band. Then, in step S215, the portable electronic device receives reflected ultrasonic signals from an object via the two or more microphones.

Next, in step S220, the portable electronic device computes a frequency shift (namely, the Doppler shift) according to the reflected ultrasonic signals.

Specifically, the portable electronic device may use the phenomenon known as the Doppler shift to sense motion. The motion may be detected as the shift in frequency of a sound wave in response to a moving object, an effect called the Doppler effect. This frequency shift is proportional to the velocity with which the object moves and the source frequency. In the present implementations, the original source (the speakers) and listener (the microphones) are stationary, thus in absence of any motion, there is no frequency change. When a user moves his/her hand, however, it reflects the sound waves, causing a shift in frequency. This frequency shift is computed by the processing unit by applying Fourier Transform (FT). In which, the Fourier Transform may be Fast Fourier Transform (FFT), partial-time FT, windowed FT, or fractional FT, however the disclosure is not limited thereto.

In another embodiment, the processing unit may use machine learning to identify the gesture that corresponds to the movement of the object according to the frequency shift.

In step S225, the portable electronic device identifies a gesture that corresponds to a movement of the object according to the frequency shift. Specifically, when the portable electronic device comprises one speaker and only two microphones, the portable electronic device identifies a one-dimensional (1D) gesture corresponding to the movement of the object according to the frequency shift. When the portable electronic device comprises one speaker and more than two microphones, the portable electronic device may determine the 1D or a 2D gesture that corresponds to the movement of the object according to the frequency shift.

In step S230, the portable electronic device performs a function that corresponds to the gesture, and the method ends.

For example, when the identified gesture is a one-dimensional gesture such as a single swipe or wave in one direction (i.e., the direction is left to right, right to left, up to down, or down to up) or a two-dimensional gesture such as a horizontal movement and a vertical movement. The gesture control can be used to one of the following functions: turning the volume of the speaker on or off, turning the volume of the speaker up or down; playing or pausing an audio file; and skipping backward to the previous audio file or skipping forward to the next audio file.

Please note that, due to the Doppler Effect, different gestures will result in different frequency shifts of the reflected ultrasonic signals, and therefore, significant features of different gestures may be recognized therefrom.

Figure 3A:
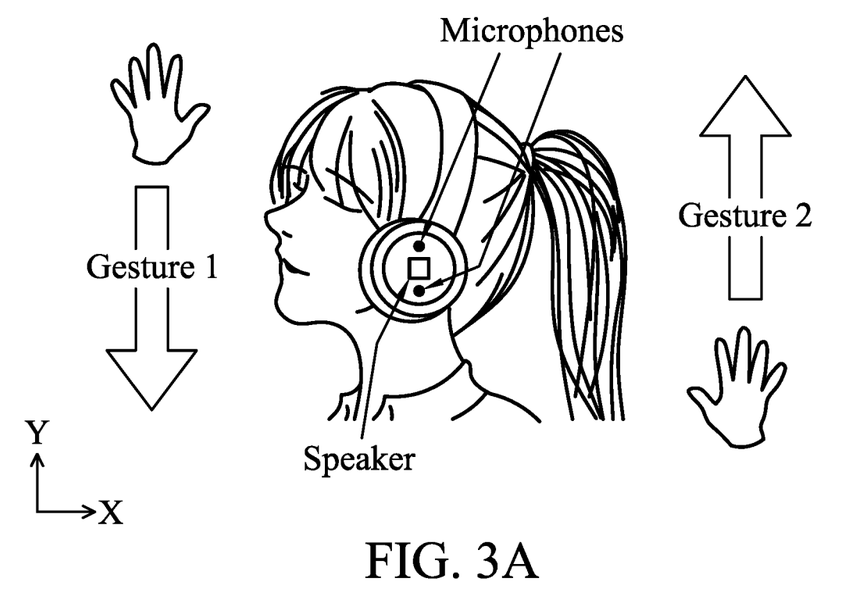
FIGS. 3A to 3B are schematic diagrams illustrating the configurations of one speaker and two microphones with exemplary 1D gestures according to embodiments of the disclosure.
Figure 3B:
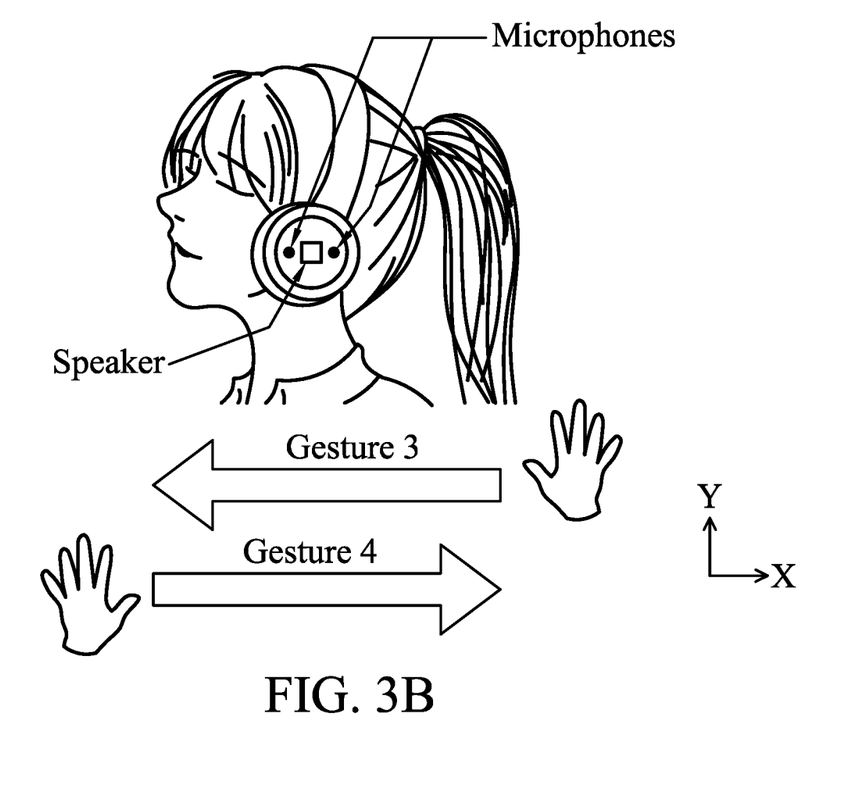

FIGS. 3A to 3B are schematic diagrams illustrating the configurations of one speaker and two microphones with exemplary 1D gestures according to embodiments of the disclosure.

Figure 4A:
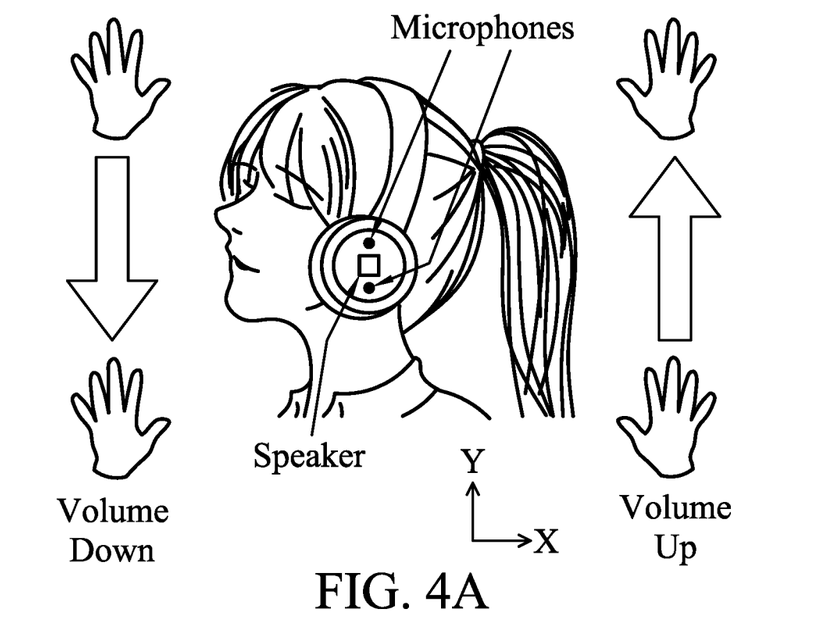
FIG. 4A shows an exemplary diagram of the portable electronic device controls over the microphones using Gestures 1 and 2 in FIG. 3A according to embodiments of the disclosure.

As shown in FIG. 3A, a speaker and two microphones are disposed in one earphone. Gesture 1 is denoted as the user's hand sweeping downwards along the Y-axis (i.e., the movement of the user's hand on the Y-axis is in one direction from top to bottom), and Gesture 2 is denoted as the user's hand sweeping upwards along the Y-axis (i.e., the movement of the user's hand on the Y-axis is in one direction from bottom to top). FIG. 4A shows an exemplary diagram of the portable electronic device controls over the microphones using Gestures 1 and 2 in FIG. 3A according to embodiments of the disclosure. As shown in FIG. 4A, a single Gesture 1 corresponds to the "Volume Down" function (i.e., turning down the volume) of the speaker, and a single Gesture 2 corresponds to the "Volume Up" function (i.e., turning up the volume) of the speaker.

Figure 4B:
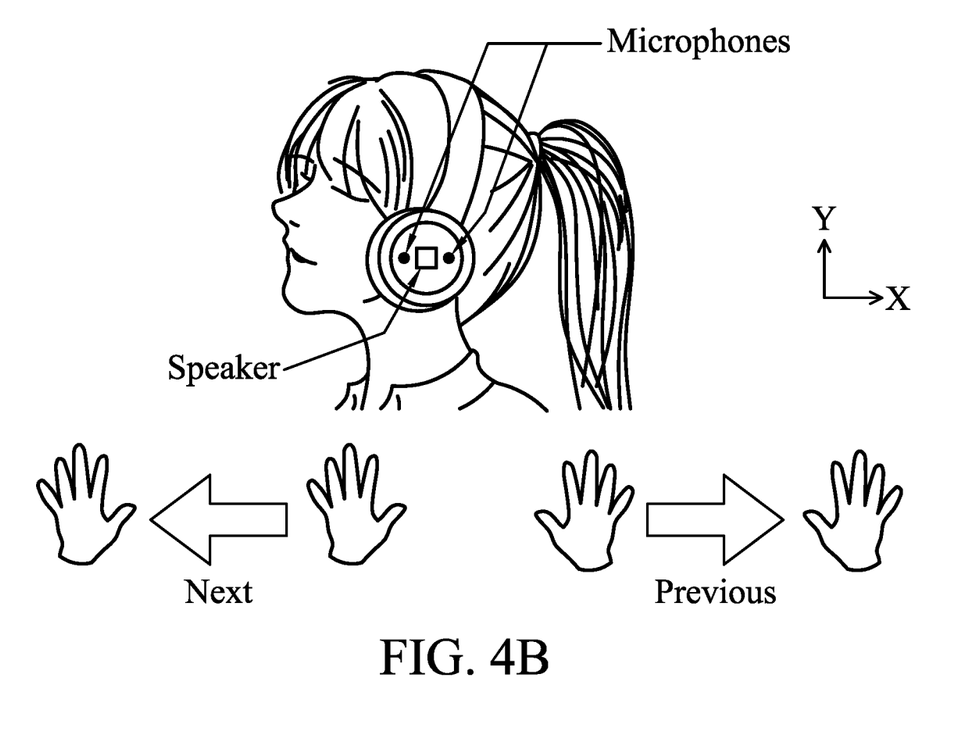
FIG. 4B shows an exemplary diagram of the portable electronic device controls over the audio file using Gestures 3 and 4 in FIG. 3B according to embodiments of the disclosure.

As shown in 3B, a speaker and two microphones are disposed in one earphone. Gesture 3 is denoted as the user's hand sweeping leftwards along the X-axis (i.e., the movement of the user's hand on the X-axis is in one direction from right to left), and Gesture 4 is denoted as the user's hand sweeping rightwards along the X-axis (i.e., the movement of the user's hand on the X-axis is in one direction from left to right). FIG. 4B shows an exemplary diagram of the portable electronic device controls over the audio file using Gestures 3 and 4 in FIG. 3B according to embodiments of the disclosure. As shown in FIG. 4B, a single Gesture 3 corresponds to the "Next" function (i.e., skipping forward to the next audio file) and a single Gesture 4 corresponds to the "Previous" function (i.e., skipping backward to the previous audio file).

Figure 5:
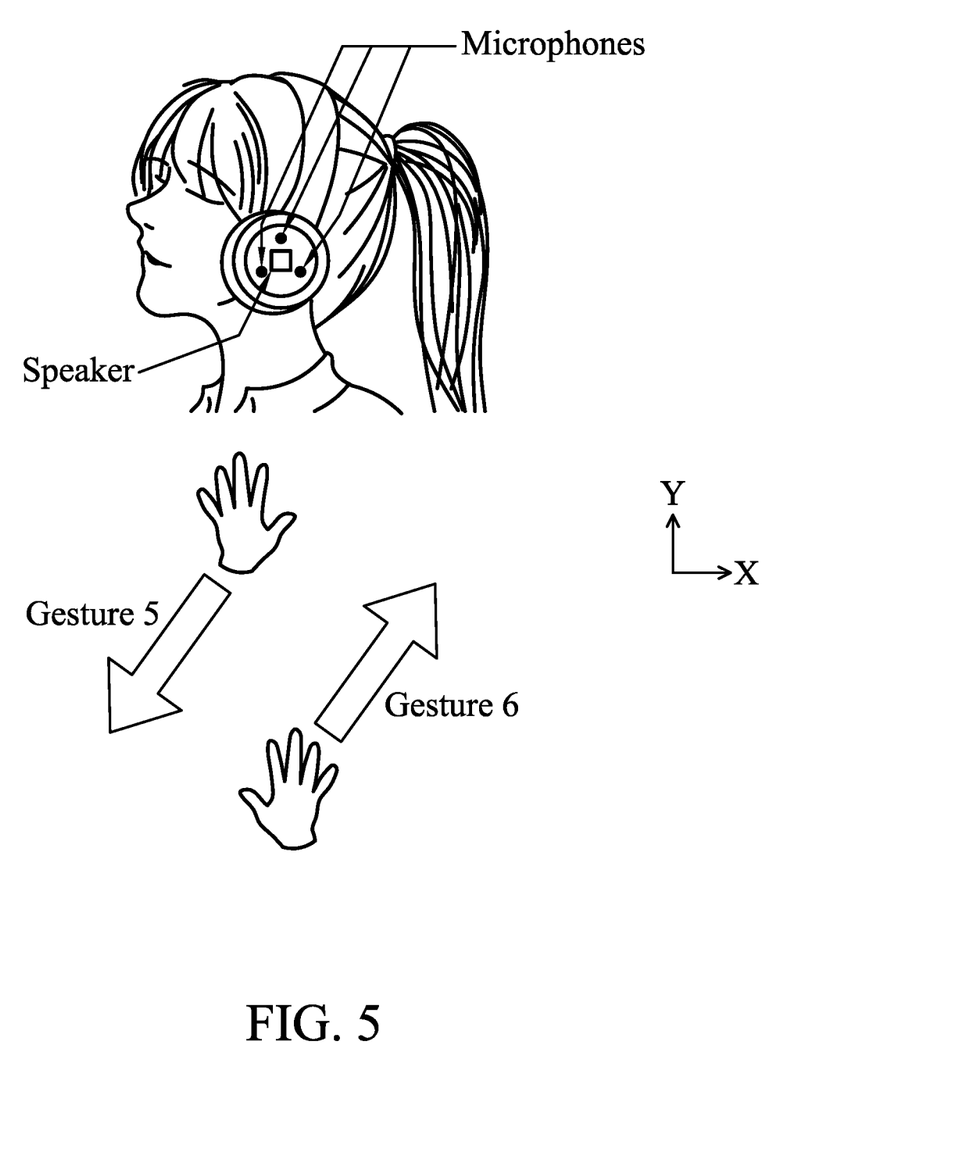
FIG. 5 is a schematic diagram illustrating the configuration of one speaker and three microphones in a portable electronic device according to an embodiment of the disclosure.

FIG. 5 is a schematic diagram illustrating the configuration of one speaker and three microphones in a portable electronic device according to an embodiment of the disclosure. As shown in FIG. 5, one speaker and three microphones are disposed at one earphone of the portable electronic device.

Gesture 5 is denoted as the user's hand sweeping from front to back along the Z-axis (i.e., the movement of the user's hand on the Z-axis is in one direction away from the portable electronic device), and Gesture 6 is denoted as the user's hand sweeping from back to front along the Z-axis (i.e., the movement of the user's hand on the Z-axis is in one direction towards the portable electronic device).

Figure 6:
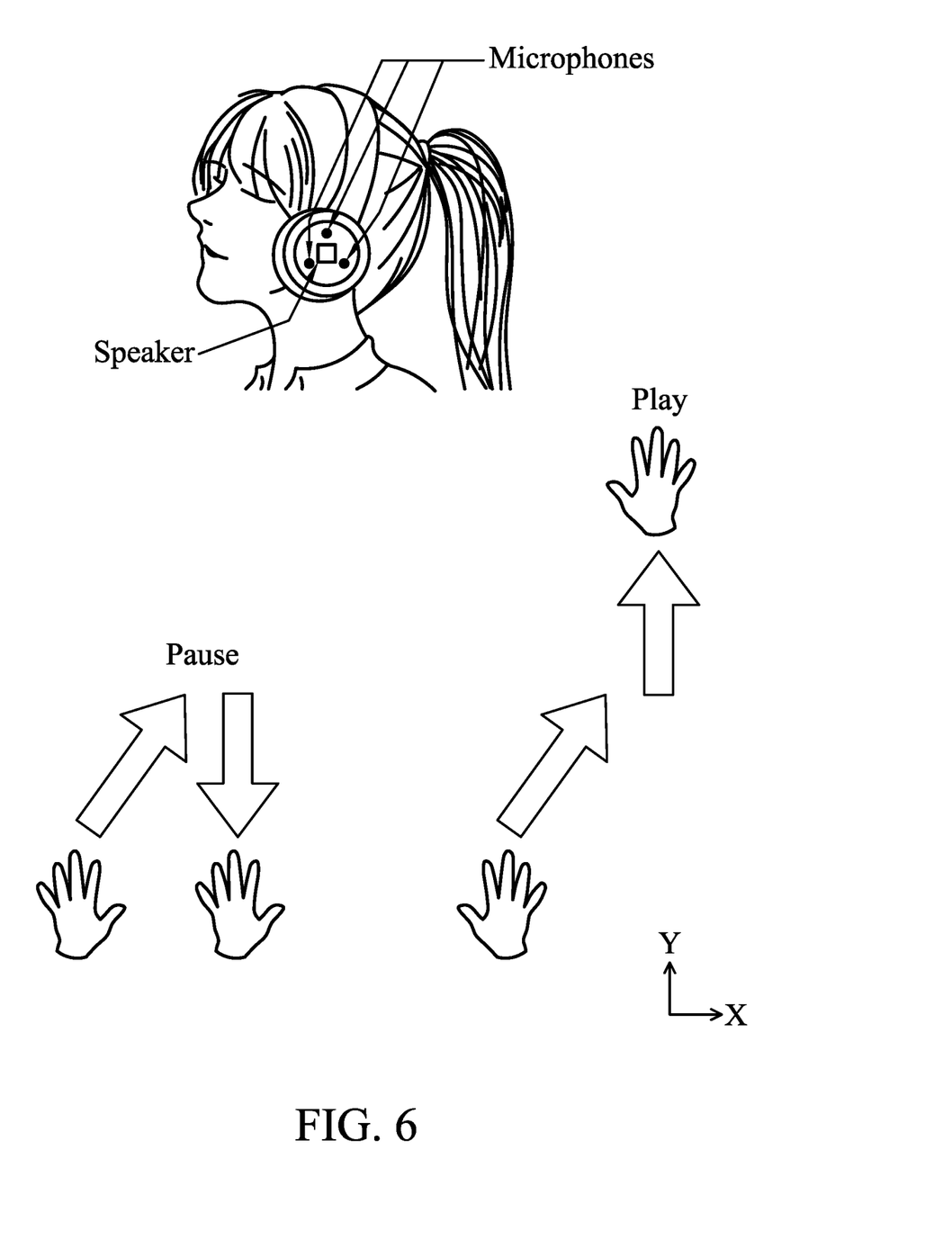
FIG. 6 shows an exemplary diagram of the portable electronic device controls over an audio file using Gestures 1 and 2 in FIG. 3A and Gesture 6 in FIG. 5 according to an embodiment of the disclosure.

FIG. 6 shows an exemplary diagram of the portable electronic device controls over an audio file using Gestures 1 and 2 in FIG. 3A and Gesture 6 in FIG. 5 according to an embodiment of the disclosure. As shown in FIG. 6, the combination of Gesture 1 instantly followed by Gesture 6 corresponds to the "Pause" function (i.e., pausing the audio file), and the combination of Gesture 2 instantly followed by Gesture 6 corresponds to the "Play" function (i.e., playing the audio file).

It should be noted that, in some embodiments of the disclosure, the number of microphones used in the FIGS. 3B, 5 and 6 may be extended to four or more, and the disclosure should not be limited to what is shown in FIGS. 3B, 5 and 6.

Furthermore, it should be appreciated that the relationship of correspondence between the gesture and the function shown in each of the foregoing embodiments is for illustrative purposes only and is not intended to limit the scope of the present disclosure.

As mentioned above, the method for touchless gesture recognition and apparatuses using the same provided in the present disclosure uses ultrasound signals to detect gestures, so that the use of the portable electronic device is more intuitive and convenient.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for touchless gesture recognition, used in a portable electronic device, comprising:
   transmitting ultrasonic signals between 20 KHz to 40 KHz via a speaker;
   receiving reflected ultrasonic signals from a hand via two or more microphones;
   computing, by a processor unit, a frequency shift according to the reflected ultrasonic signals;
   identifying, by the processor unit, a gesture that corresponds to a movement of the hand according to the frequency shift, wherein the frequency shift is computed the processor unit by applying Fourier Transform (FT); and
   performing, by the processor unit, a function that corresponds to the gesture;
   wherein the gesture is a two-dimensional gesture when there are more than two microphones.

2. The method as claimed in claim 1, wherein one of the following functions is performed:
   turning the volume of the speaker on or off;
   turning the volume of the speaker up or down;
   playing or pausing an audio file; and
   skipping backward to a previous audio file or skipping forward to a next audio file.

3. The method as claimed in claim 1, wherein the gesture is a one-dimensional gesture.

4. The method as claimed in claim 1, wherein the movement of the hand is a swipe or wave in one direction.

5. The method as claimed in claim 1, wherein the direction is left to right, right to left, up to down, or down to up.

6. The method as claimed in claim 1, wherein the gesture corresponding to the movement of the hand is identified by machine learning.

7. The method as claimed in claim 1, wherein the portable electronic device is an earphone.

8. A portable electronic device, comprising:
   a speaker, transmitting ultrasonic signals between 20 KHz to 40 KHz;
   two or more microphones, receiving reflected ultrasonic signals from a hand;
   a processing unit, coupled to the speaker and the two or more microphones; and
   one or more computer storage media for storing one or more computer-readable instructions, wherein the processing unit is configured to drive the computer storage media to execute the following tasks:

computing a frequency shift according to the reflected ultrasonic signals;

identifying a gesture that corresponds to a movement of the hand according to the frequency shift, wherein the frequency shift is computed the processor unit by applying Fourier Transform (FT); and performing a function that corresponds to the gesture, wherein the gesture is a two-dimensional gesture when there are more than two microphones.

9. The portable electronic device as claimed in claim 8, wherein the function comprises one of the following:

turning the volume of the speaker on or off;
turning the volume of the speaker up or down;
playing or pausing an audio file; and
skipping backward to a previous audio file or skipping forward to a next audio file.

10. The portable electronic device as claimed in claim 8, wherein the gesture is a one-dimensional gesture.

11. The portable electronic device as claimed in claim 8, wherein the movement of the hand is a swipe or wave in one direction.

12. The portable electronic device as claimed in claim 8, wherein the direction is left to right, right to left, up to down, or down to up.

13. The portable electronic device as claimed in claim 8, wherein the gesture corresponding to the movement of the hand is identified by machine learning.

14. The portable electronic device as claimed in claim 8, wherein the portable electronic device is an earphone.

\* \* \* \* \*